United States Patent
Kim et al.

(10) Patent No.: US 10,196,080 B2
(45) Date of Patent: Feb. 5, 2019

(54) STEERING APPARATUS FOR VEHICLE

(71) Applicant: MANDO CORPORATION, Pyeongtaek-si, Gyeonggi-do (KR)

(72) Inventors: Doo Hyuk Kim, Gunpo-si (KR); Sang Hyun Park, Yongin-si (KR); Dong Keun Kim, Seongnam-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 41 days.

(21) Appl. No.: 15/487,810

(22) Filed: Apr. 14, 2017

(65) Prior Publication Data
US 2017/0313343 A1 Nov. 2, 2017

(30) Foreign Application Priority Data
Apr. 28, 2016 (KR) .................. 10-2016-0052136

(51) Int. Cl.
| | |
|---|---|
| B62D 1/19 | (2006.01) |
| B62D 1/184 | (2006.01) |
| B62D 1/185 | (2006.01) |
| B62D 1/187 | (2006.01) |

(52) U.S. Cl.
CPC ............ *B62D 1/184* (2013.01); *B62D 1/185* (2013.01); *B62D 1/187* (2013.01); *B62D 1/195* (2013.01)

(58) Field of Classification Search
CPC ........ B62D 1/184; B62D 1/185; B62D 1/187; B62D 1/195
See application file for complete search history.

(56) References Cited

U.S. PATENT DOCUMENTS

| | | | | |
|---|---|---|---|---|
| 7,752,940 B2* | 7/2010 | Lutz | ....................... | B62D 1/184 280/775 |
| 8,413,541 B2* | 4/2013 | Davies | ................... | B62D 1/184 280/777 |
| 8,505,408 B2* | 8/2013 | Havlicek | ............... | B62D 1/195 280/775 |
| 8,827,310 B2* | 9/2014 | Schnitzer | ............... | B62D 1/184 280/775 |

(Continued)

FOREIGN PATENT DOCUMENTS

| | | |
|---|---|---|
| DE | 19915341 A1 | 10/2000 |
| DE | 102005036582 A1 | 2/2007 |
| DE | 102014110204 B3 | 10/2015 |

OTHER PUBLICATIONS

German Office Action dated Mar. 19, 2018 issued in German Patent Application No. 102017004011.7.

*Primary Examiner* — Drew J Brown
(74) *Attorney, Agent, or Firm* — McDermott Will & Emery LLP

(57) ABSTRACT

The present invention provides a steering apparatus for a vehicle, the apparatus including: a plate bracket supported on distance brackets and having a first slot through which an adjustment bolt passes, the distance brackets being coupled to the outer circumferential surface of an upper tube to face each other; a stationary gear coupled to the plate bracket, wherein the stationary gear has a second slot that corresponds to the first slot and through which the adjustment bolt passes and first gear teeth formed at opposite edges thereof; and a movable gear having a through-hole through which adjustment bolt passes and second gear teeth formed on opposite sides thereof and engaged with the first gear teeth.

16 Claims, 7 Drawing Sheets

(56) References Cited

U.S. PATENT DOCUMENTS

| | | | | |
|---|---|---|---|---|
| 9,604,663 | B2* | 3/2017 | Tomiyama | B62D 1/184 |
| 2002/0171235 | A1* | 11/2002 | Riefe | B62D 1/184 |
| | | | | 280/775 |
| 2004/0261565 | A1* | 12/2004 | Uphaus | B62D 1/184 |
| | | | | 74/493 |
| 2005/0016315 | A1* | 1/2005 | Breuss | B62D 1/184 |
| | | | | 74/493 |
| 2008/0178702 | A1* | 7/2008 | Lutz | B62D 1/184 |
| | | | | 74/493 |
| 2009/0013817 | A1* | 1/2009 | Schnitzer | B62D 1/184 |
| | | | | 74/493 |
| 2011/0041642 | A1* | 2/2011 | Havlicek | B62D 1/184 |
| | | | | 74/493 |

* cited by examiner

STEERING APPARATUS FOR VEHICLE

CROSS REFERENCE TO RELATED APPLICATION

This application claims priority from Korean Patent Application No. 10-2016-0052136, filed on Apr. 28, 2016, which is hereby incorporated by reference for all purposes as if fully set forth herein.

BACKGROUND OF THE INVENTION

1. Field of the Invention

The present invention relates to a steering apparatus for a vehicle. More specifically, the present invention relates to a steering apparatus for a vehicle in which when a column is in a tilt or telescopic operation, locking and unlocking are smoothly carried out even though a movable gear and a stationary gear are not engaged with each other at correct positions, and when the column is locked after the tilt or telescopic operation, even though a collision of the vehicle occurs in a state in which the movable gear and the stationary gear are not engaged with each other at correct positions, the movable gear and the stationary gear are engaged with each other so that a collapse motion of the column due to the collision is carried out without error.

2. Description of the Prior Art

FIG. 1 is a partial exploded perspective view of a steering apparatus for a vehicle in the related art.

As illustrated in FIG. 1, the vehicle steering apparatus 100 in the related art includes: an upper tube 105 located around a lower tube 103 to surround a part of the lower tube 103; the lower tube 103 surrounding a steering column 101 and capable of moving into the upper tube 105; a mounting bracket 107 installed on a vehicle body to support the upper tube 105 and having a support part 108 on the lower side thereof, the support part 108 having a slit 125 formed therethrough; a hinge bracket 109 installed to connect a hinge 117 connected with the lower tube 103 and the vehicle body; a lower support member 111 fixed to a lower part of the upper tube 105 and having slots 119 formed on opposite sides thereof; an adjustment bolt 127 passing through the slots 119 of the lower support member 111 and fastened to a fixing nut 123; a cam 131 fixed to a movable gear block 129 and mounted on the adjustment bolt 127, wherein the cam 131 makes a gap for tilt and telescopic adjustment by means of a protrusion on the front surface thereof when being unlocked; an adjustment lever 133 having a structure corresponding to the cam 131 and mounted on the adjustment bolt 127; and the adjustment nut 123 mounted on the distal end portion of the adjustment bolt 127 together with a bush 135 and installed on the outside of the adjustment lever 133.

A tilt and telescopic locking device includes the movable gear block 129, a first telescopic stationary gear 113, a second telescopic stationary gear 115, a first tilting stationary gear 137, and a second tilting stationary gear 139.

The movable gear block 129 is mounted on the adjustment bolt 127; the first telescopic stationary gear 113 is fixed to the outside of the lower support member 111; the second telescopic stationary gear 115 is horizontally installed on the inside of the movable gear block 129 and is engaged with the first telescopic stationary gear 113; the first tilting stationary gear 137 has an arc shape and is fixed to the outside of the support part 108 of the mounting bracket 107; and the second tilting stationary gear 139 is horizontally fixed to the outside of the movable gear block 129 and is engaged with the first tilting stationary gear 137.

However, the vehicle steering apparatus in the related art, which has the above-described structure, has a problem in that the column is not locked if the gears are not engaged with each other at correct positions when the column is locked after a tilt operation and a telescopic operation.

Furthermore, the steering apparatus has a problem in that the adjustment lever or the gear teeth of the stationary gears and the movable gear block are damaged if a driver operates the adjustment lever with an excessive force in a state in which the gears are not engaged with each other at correct positions when the column is locked.

In addition, the steering apparatus has a problem in that, when a collision occurs while driving in a state in which the damage to the gear teeth of the stationary gears and the movable gear block is not recognized, the column is not fixed so that a collapse motion is not correctly carried out, thereby causing a deterioration in performance during a collision.

SUMMARY OF THE INVENTION

In this background, an aspect of the present invention is to provide a steering apparatus for a vehicle in which when a column is in a tilt or telescopic operation, locking and unlocking are smoothly carried out even though a movable gear and a stationary gear are not engaged with each other at correct positions, and when the column is locked after the tilt or telescopic operation, even though a collision of the vehicle occurs in a state in which the movable gear and the stationary gear are not engaged with each other at correct positions, the movable gear and the stationary gear are engaged with each other so that a collapse motion of the column due to the collision is carried out without error.

The aspect of the present invention is not limited thereto, and other unmentioned aspects of the present invention may be clearly appreciated by those skilled in the art from the following descriptions.

In accordance with an aspect of the present invention, there is provided a steering apparatus for a vehicle that includes: a plate bracket supported on distance brackets and having a first slot through which an adjustment bolt passes, the distance brackets being coupled to the outer circumferential surface of an upper tube to face each other; a stationary gear coupled to the plate bracket, wherein the stationary gear has a second slot that corresponds to the first slot and through which the adjustment bolt passes and first gear teeth formed at opposite edges thereof; and a movable gear having a through-hole through which the adjustment bolt passes and second gear teeth formed on opposite sides thereof and engaged with the first gear teeth.

As described above, according to the embodiment of the present invention, the vehicle steering apparatus has an effect that when the column is in a tilt or telescopic operation, locking and unlocking are smoothly carried out even though the movable gear and the stationary gear are not engaged with each other at correct positions.

In addition, according to the embodiment of the present invention, the vehicle steering apparatus has an effect that when the column is locked after the tilt or telescopic operation, even though a collision of the vehicle occurs in a state in which the movable gear and the stationary gear are not engaged with each other at correct positions, the movable gear and the stationary gear are engaged with each other so that a collapse motion of the column due to the collision is carried out without error.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
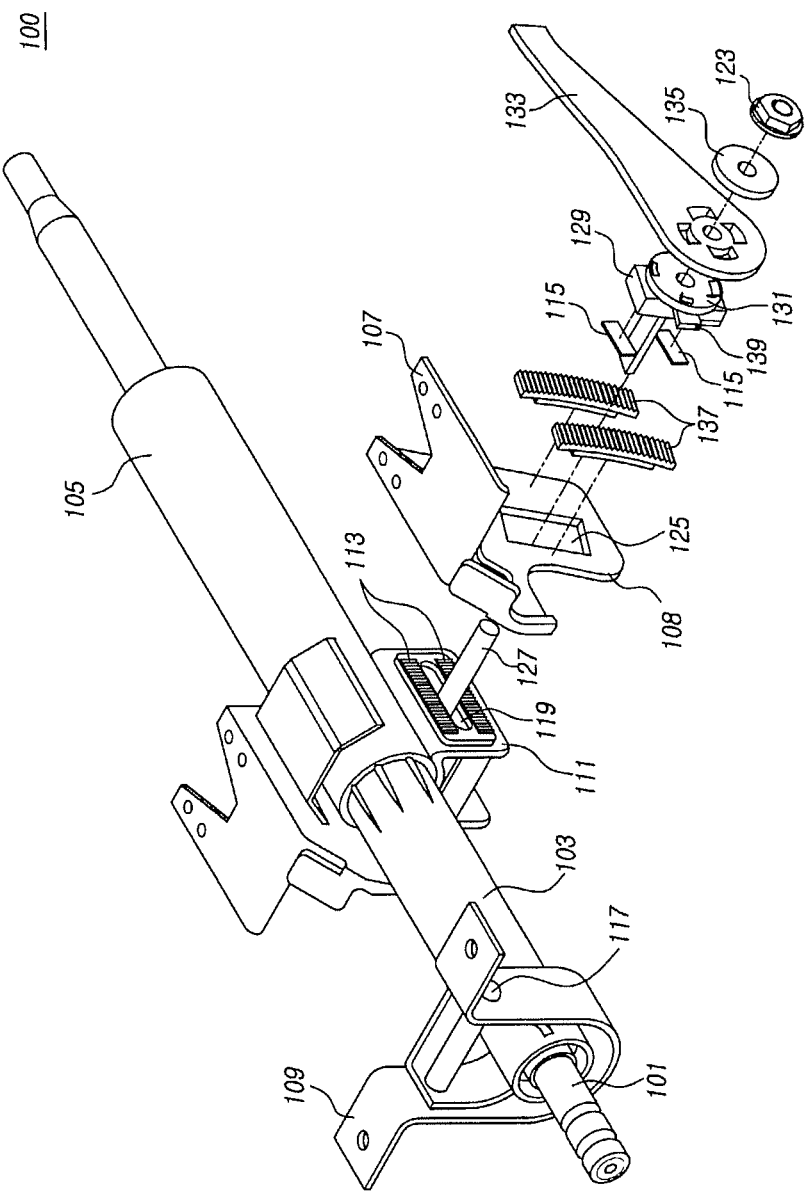
FIG. 1 is a partial exploded perspective view of a steering apparatus for a vehicle in the related art.

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
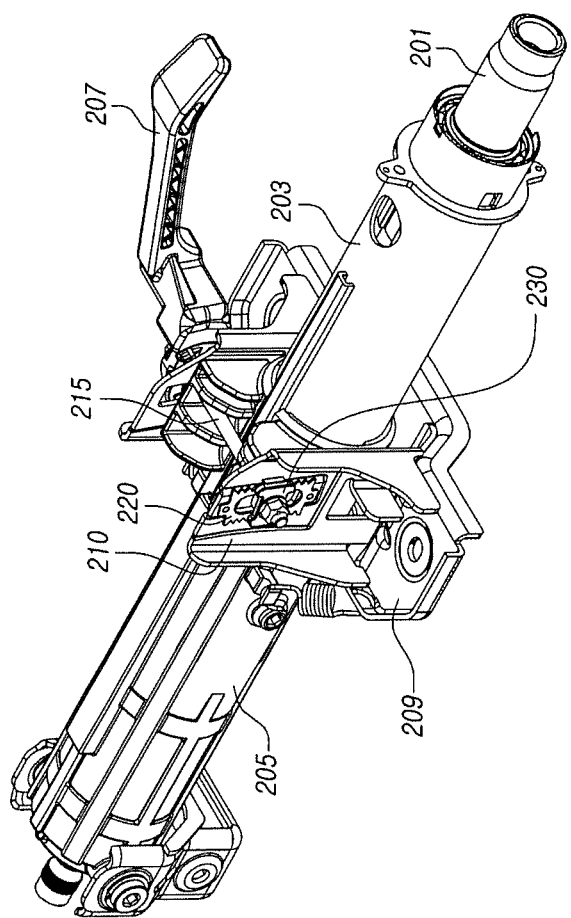
FIG. 2 is a perspective view of a steering apparatus for a vehicle according to one embodiment of the present invention.
Figure 3:
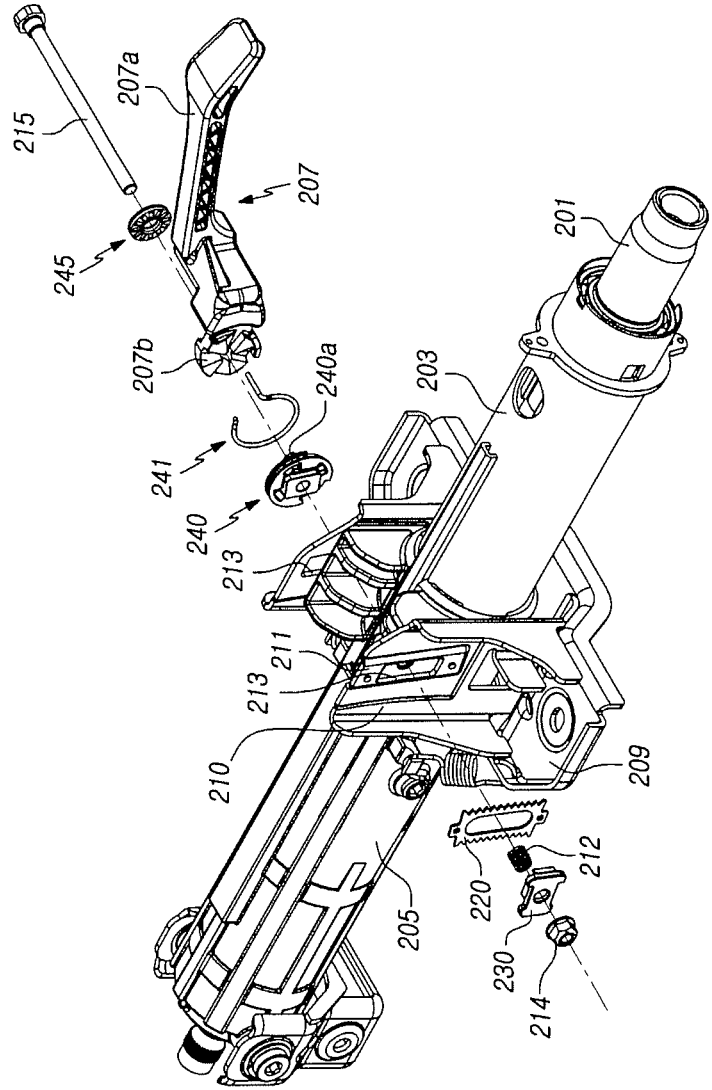
FIG. 3 is an exploded perspective view of FIG. 2.
Figure 4:
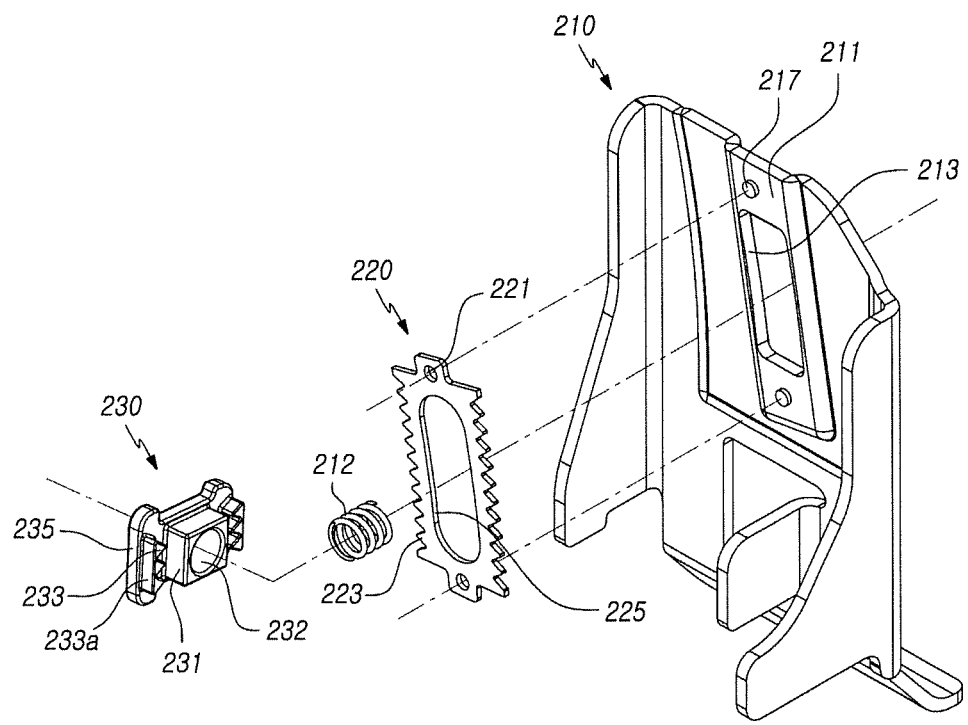
FIG. 4 is an exploded perspective view illustrating a part of the vehicle steering apparatus according to one embodiment of the present invention.
Figure 5:
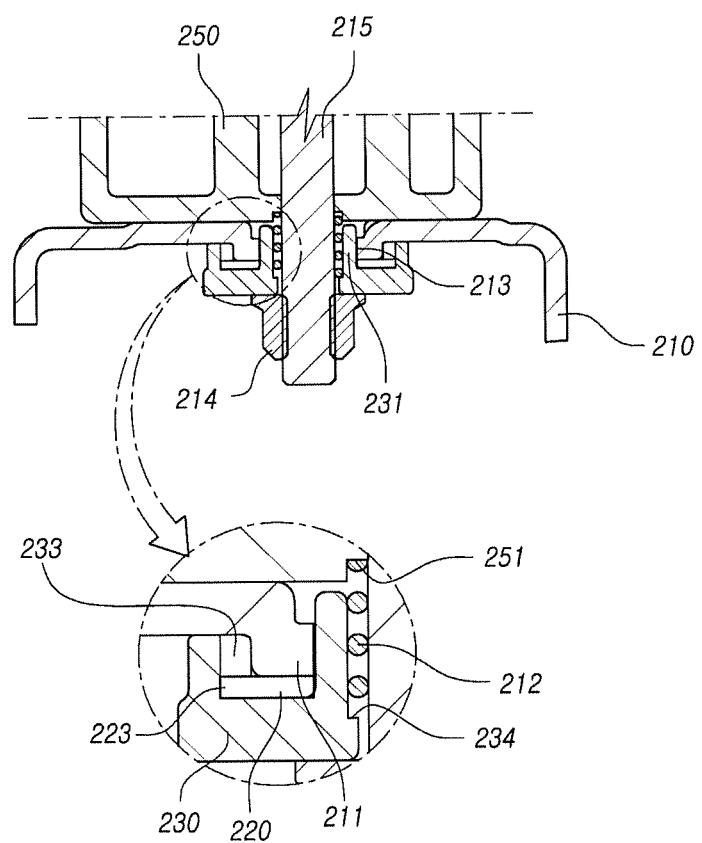
FIG. 5 is a sectional view illustrating an assembled state of FIG. 4.
Figure 6:
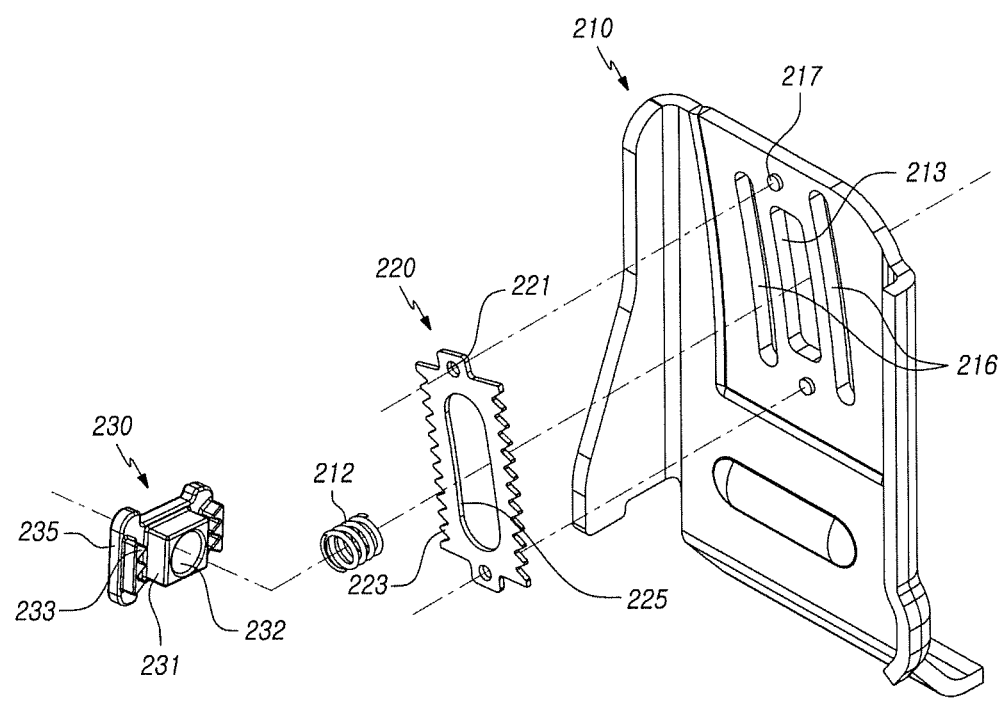
FIG. 6 is an exploded perspective view illustrating a part of the vehicle steering apparatus according to another embodiment of the present invention.
Figure 7:
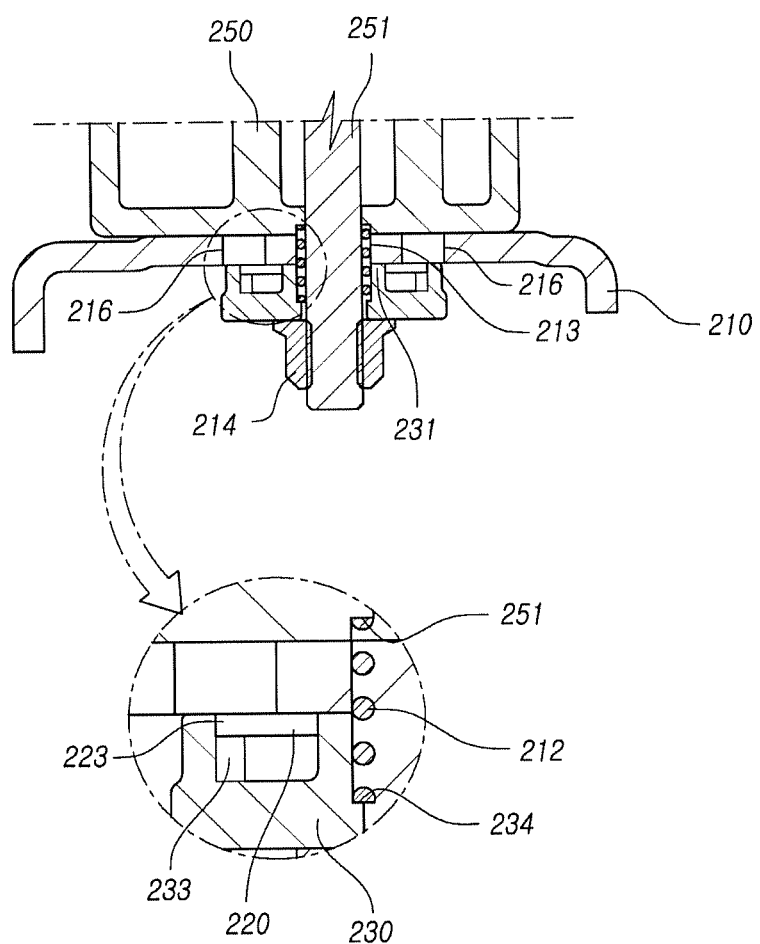
FIG. 7 is a sectional view illustrating an assembled state of FIG. 6.

FIG. 2 is a perspective view of a steering apparatus for a vehicle according to one embodiment of the present invention. FIG. 3 is an exploded perspective view of FIG. 2. FIG. 4 is an exploded perspective view illustrating a part of the vehicle steering apparatus according to one embodiment of the present invention. FIG. 5 is a sectional view illustrating an assembled state of FIG. 4. FIG. 6 is an exploded perspective view illustrating a part of the vehicle steering apparatus according to another embodiment of the present invention. FIG. 7 is a sectional view illustrating an assembled state of FIG. 6.

As illustrated in these drawings, the steering apparatus for a vehicle, according to one embodiment of the present invention, includes: a plate bracket 210 supported on distance brackets 250 and having first slots 213 through which an adjustment bolt 215 passes, the distance brackets being coupled to the outer circumferential surface of an upper tube 203 to face each other; a stationary gear 220 coupled to the plate bracket 210, wherein the stationary gear 220 has a second slot 225 that corresponds to the first slots 213 and through which the adjustment bolt 215 passes and first gear teeth 223 formed at opposite edges thereof; and a movable gear 230 having a through-hole 232 through which the adjustment bolt 215 passes and second gear teeth 233 formed on opposite sides thereof and engaged with the first gear teeth 223.

The upper tube 203 and a lower tube 205 have a hollow shape. The upper tube 203 is inserted into the lower tube 205, or the lower tube 205 is inserted into the upper tube 203. The upper and lower tubes 203 and 205 are coupled together to enable an axial telescopic motion and have a steering column 201 inside.

The distance brackets 250 are coupled to the outer circumferential surface of the upper tube 203 to face each other, and the plate bracket 210 is supported on, and coupled to, the outsides of the distance brackets 250 to apply pressure to the distance brackets 250, or to release pressure from the same, when an adjustment lever 207 is operated.

The plate bracket 210 is coupled with a mounting bracket 209 and fixed to the body of a vehicle.

The adjustment lever 207 and an operating cam 240 are coupled to one side of the plate bracket 210, and the stationary gear 220, the movable gear 230, and a lever nut 214 on the opposite side of the plate bracket 210 are coupled to the adjustment bolt 215 so that the adjustment lever 207 can operate.

The adjustment lever 207 has a handle 207a on one side thereof and a second cam 207b on an opposite side thereof, and the second cam 207b is coupled with a first cam 240a formed on one side surface of the operating cam 240 and is spaced apart from the first cam 240a in the axial direction of the adjustment bolt 215. The operating cam 240 and the second cam 207b of the adjustment lever 207 are coupled to each other by a resilient object 241 that serves as a damper to prevent noise caused by rapid loosening of the operating cam 240 and the second cam 207b.

Accordingly, when the adjustment lever 207 is rotated in a locking or unlocking direction, the first and second cams 240a and 207b are spaced apart from each other in the axial direction of the adjustment bolt 215 by the protruding height of the first and second cams 240a and 207b along inclined surfaces thereof facing each other, or return to the original positions, while rotating.

If the first and second cams 240a and 207b are spaced apart from each other by rotation of the adjustment lever 207, the movable gear 230 is engaged with the stationary gear 220, and thus the column is locked. In contrast, if the first and second cams 240a and 207b return to the original positions, the movable gear 230 is separated and disengaged from the stationary gear 220, and thus the column is unlocked.

The plate bracket 210 has the first slots 213 through which the adjustment bolt 215 passes, and the stationary gear 220 has the second slot 225 corresponding to the first slots 213. Accordingly, when the adjustment lever 207 is rotated to the unlocking position, the movable gear 230 and the stationary gear 220 are disengaged from each other so that the adjustment bolt 215 can move in the lengthwise direction of the first and second slots 213 and 225.

The stationary gear 220 is coupled to the plate bracket 210 and has the first gear teeth 223 formed at the opposite edges thereof. The movable gear 230 has the through-hole 232 formed through the central portion thereof through which the adjustment bolt 215 passes and the second gear teeth 233 formed on the opposite sides thereof and engaged with the first gear teeth 223 of the stationary gear 220.

Accordingly, when the adjustment lever 207 is operated, the movable gear 230 moves in the axial direction of the adjustment bolt 215, and the first gear teeth 223 and the second gear teeth 233 are engaged with, or disengaged from, each other so that the column is locked or unlocked.

The movable gear 230 has a guide part 231 that protrudes from the body 235 thereof and is inserted into the first slots 213 and the second slot 225 to slide along the same, and the guide part 231 has the through-hole 232 that is formed through the central portion thereof and through which the adjustment bolt 215 is coupled. Accordingly, the adjustment bolt 215 moves together with the movable gear 230 along the first slots 213 and the second slot 225 in a state in which the adjustment bolt 215 is inserted into the movable gear 230.

The movable gear 230 has gear-formed parts 233a on opposite sides of the guide part 231, the gear-formed parts 233 protruding in the same direction as the guide part 231, and the stationary gear is received in the space between the guide part 231 and the gear-formed parts 233a.

Accordingly, when the movable gear 230 moves in the axial direction of the adjustment bolt 215 for locking or unlocking, the movable gear 230 and the stationary gear 220 are engaged with, or disengaged from, each other.

The second gear teeth 233 are formed on the insides of the gear-formed parts 233a, that is, on the facing sides of the gear-formed parts 233a, and are engaged with the first gear teeth 223 when the movable gear 230 moves in the axial direction of the adjustment bolt 215 by operating the adjustment lever 207.

End portions of the gear-formed parts 233a of the movable gear 230 are supported on the outside of the plate bracket 210 so that locking support forces on the opposite sides of the plate bracket 210 increase.

A first step 234 is formed on the inside of the through-hole 232 of the guide part 231, a second step 251 is formed on the outside of the distance bracket 250, and a resilient member 212 is coupled between the first step 234 and the second step 251. The movable gear 230 and the stationary gear 220 are disengaged from each other by the resilient force of the resilient member 212 when the adjustment lever 207 is rotated to the unlocking position in a state in which the movable gear 230 and the stationary gear 220 are engaged with each other.

The plate bracket 210 has a protruding surface 211 that protrudes outward in a stepwise manner from the contact surface making contact with the distance bracket 250, and the first slot 213 is formed through the protruding surface 211. The protruding surface 211 has one of a protrusion 217 and a coupling hole 221, the stationary gear 220 has the other, and the protrusion 217 and the coupling hole 221 are coupled with each other.

The stationary gear 220 is brought into close contact with the protruding surface 211 of the plate bracket 210, and the first gear teeth 223 of the stationary gear 220 extend beyond the opposite ends of the protruding surface 211. Accordingly, even when a collision of the vehicle occurs in a state in which the movable gear 230 and the stationary gear 220 are not correctly engaged with each other, the engagement is correctly carried out if an impulsive load is transmitted.

Namely, when the first gear teeth 223 of the stationary gear 220 and the second gear teeth 233 of the movable gear 230 are locked according to the location of the adjustment bolt 215 in a state in which the crests and roots thereof are not engaged with each other and the crests, or the roots, thereof overlap each other, the first gear teeth 223 of the stationary gear 220 are resiliently bent and locked at the opposite ends of the protruding surface 211 due to the clamping force of the adjustment lever 207.

Accordingly, if a collision of the vehicle occurs, when the movable gear 230 moves along the first slots 213 and the second slot 225 while an instantaneous impulsive load is being transmitted, the first gear teeth 223 of the stationary gear 220 are engaged with the second gear teeth 233 of the movable gear 230 while being resiliently restored so that a collapse motion of the column due to the collision is carried out without error.

As illustrated in FIGS. 6 and 7, the plate bracket 210 may have cutaway portions 216 formed on opposite sides of the first slot 213 in the lengthwise direction of the first slot 213. In this case, the stationary gear 220 is formed such that the second gear teeth 233 thereof are located above the cutaway portions 216.

Namely, when the first gear teeth 223 of the stationary gear 220 and the second gear teeth 233 of the movable gear 230 are locked according to the location of the adjustment bolt 215 in a state in which the crests and roots thereof are not engaged with each other and the crests, or the roots, thereof overlap each other, as described above, the first gear teeth 223 of the stationary gear 220 are resiliently bent and locked into the cutaway portions 216 at the opposite ends of the protruding surface 211 due to the clamping force of the adjustment lever 207.

Further, if a collision of the vehicle occurs, when the movable gear 230 moves along the first slots 213 and the second slot 225 while an instantaneous impulsive load is being transmitted, the first gear teeth 223 of the stationary gear 220 are engaged with the second gear teeth 233 of the movable gear 230 while being resiliently restored so that a collapse motion of the column due to the collision is carried out without error.

As described above, according to the embodiments of the present invention, the steering apparatus for a vehicle has an effect that when the column is in a tilt or telescopic operation, locking and unlocking are smoothly carried out even though the movable gear and the stationary gear are not engaged with each other at correct positions.

In addition, according to the embodiments of the present invention, the steering apparatus has an effect that when the column is locked after the tilt or telescopic operation, even though a collision of the vehicle occurs in a state in which the movable gear and the stationary gear are not engaged with each other at correct positions, the movable gear and the stationary gear are engaged with each other so that a collapse motion of the column due to the collision is carried out without error.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

| Description of reference numerals | | | |
|---|---|---|---|
| 201: | Steering column | 203: | Upper tube |
| 205: | Lower tube | 207: | Adjustment lever |
| 210: | Plate bracket | 211: | Protruding surface |
| 212: | Resilient member | 213: | First slot |
| 216: | Cutaway portion | 217: | Protrusion |
| 220: | Stationary gear | 221: | Coupling hole |
| 223: | First gear teeth | 225: | Second slot |
| 230: | Movable gear | 231: | Guide part |
| 233: | Second gear teeth | 250: | Distance bracket |

What is claimed is:

1. A steering apparatus for a vehicle, the apparatus comprising:
a plate bracket supported on distance brackets, which are coupled to an outer circumferential surface of an upper tube to face each other, and having a first slot through which an adjustment bolt passes, wherein the plate bracket has an open upper side;
a stationary gear coupled to the plate bracket, wherein the stationary gear has a second slot that corresponds to the first slot and through which the adjustment bolt passes and first gear teeth formed at opposite edges thereof; and
a movable gear having a through-hole through which the adjustment bolt passes and second gear teeth formed on opposite sides thereof and engaged with the first gear teeth,
wherein the first gear teeth are configured to be resiliently bent by a clamping force of an adjustment lever.

2. The steering apparatus of claim 1, wherein the movable gear has a guide part that protrudes from a body part thereof and is inserted into the first and second slots to slide along the first and second slots.

3. The steering apparatus of claim 2, wherein the through-hole is formed through the central portion of the guide part, and the adjustment bolt is coupled through the through-hole.

4. The steering apparatus of claim 3, wherein the movable gear has gear-formed parts on opposite sides of the guide part, the gear-formed parts protruding in the same direction as the guide part, and the stationary gear is received in the space between the guide part and the gear-formed parts.

5. The steering apparatus of claim 4, wherein the movable gear has the second gear teeth formed on the insides of the gear-formed parts in the direction parallel to the first gear teeth.

6. The steering apparatus of claim 4, wherein end portions of the gear-formed parts of the movable gear are supported on the outside of the plate bracket while locking.

7. The steering apparatus of claim 4, wherein a first step is formed on the inside of the through-hole of the guide part, a second step is formed on the outside of the distance bracket, and a resilient member is coupled between the first step and the second step.

8. The steering apparatus of claim 1, wherein the plate bracket has a protruding surface that protrudes outward in a stepwise manner from a contact surface making contact with the distance bracket, and the first slot is formed through the protruding surface.

9. The steering apparatus of claim 8, wherein the protruding surface has one of a protrusion and a coupling hole, the stationary gear has the other, and the protrusion and the coupling hole are coupled with each other.

10. The steering apparatus of claim 8, wherein the stationary gear is brought into close contact with the protruding surface, and the first gear teeth extend beyond opposite ends of the protruding surface.

11. The steering apparatus of claim 1, wherein the plate bracket has cutaway portions formed on opposite sides of the first slot in the lengthwise direction of the first slot.

12. The steering apparatus of claim 11, wherein the movable gear has a guide part that protrudes from a body part thereof and is inserted into the first and second slots to slide along the first and second slots.

13. The steering apparatus of claim 12, wherein the through-hole is formed through the central portion of the guide part, and the adjustment bolt is coupled through the through-hole.

14. The steering apparatus of claim 13, wherein the movable gear has gear-formed parts on opposite sides of the guide part, the gear-formed parts protruding in the same direction as the guide part, and the stationary gear is received in the space between the guide part and the gear-formed parts.

15. The steering apparatus of claim 14, wherein the movable gear has the second gear teeth formed on the insides of the gear-formed parts in the direction parallel to the first gear teeth.

16. The steering apparatus of claim 11, wherein the stationary gear is formed such that the second gear teeth are located above the cutaway portions.

* * * * *